United States Patent
Brodjonegoro et al.

(10) Patent No.: US 12,325,898 B1
(45) Date of Patent: Jun. 10, 2025

(54) HIGH-PRESSURE REACTOR ACID ADDING SYSTEM FOR LATERITE NICKEL ORE HYDROMETALLURGY

(71) Applicants: PT ESG NEW ENERGY MATERIAL, Dki Jakarta (ID); PT QMB NEW ENERGY MATERIALS, Dki Jakarta (ID); GEM CO., LTD., Guangdong (CN); PT GEM INDONESIA NEW ENERGY MATERIALS, Dki Jakarta (ID)

(72) Inventors: Satryo Soemantri Brodjonegoro, Dki Jakarta (ID); Kaihua Xu, Guangdong (CN); Rizky Wanaldi, Dki Jakarta (ID); Tegar Mukti Aji, Dki Jakarta (ID); Andi Syaputra Hasibuan, Dki Jakarta (ID); Shella Arinda, Dki Jakarta (ID); Evan Wahyu Kristiyanto, Dki Jakarta (ID); Yi Wang, Dki Jakarta (ID); Arnaldo Marulitua Sinaga, Dki Jakarta (ID)

(73) Assignees: PT ESG NEW ENERGY MATERIAL, Jakarta Selatan (ID); PT QMB NEW ENERGY MATERIALS, Jakarta Selatan (ID); GEM CO., LTD, Shenzhen (CN); PT GEM INDONESIA NEW ENERGY MATERIALS, Jakarta Selatan (ID)

( * ) Notice: Subject to any disclaimer, the term of this patent is extended or adjusted under 35 U.S.C. 154(b) by 0 days.

(21) Appl. No.: 18/870,456

(22) PCT Filed: Jun. 30, 2023

(86) PCT No.: PCT/CN2023/104629
§ 371 (c)(1),
(2) Date: Nov. 29, 2024

(87) PCT Pub. No.: WO2025/000446
PCT Pub. Date: Jan. 2, 2025

(51) Int. Cl.
*C22B 3/08* (2006.01)
*C22B 3/00* (2006.01)

(52) U.S. Cl.
CPC .............. *C22B 3/08* (2013.01); *C22B 23/043* (2013.01)

(58) Field of Classification Search
CPC .... C22B 3/00; C22B 3/04; C22B 3/06; C22B 3/08; C22B 23/00; C22B 23/0407; C22B 23/0415; C22B 23/043
See application file for complete search history.

(56) References Cited

U.S. PATENT DOCUMENTS 10,913,040 B2 * 2/2021 Li ........................... B01J 19/18
2018/0078917 A1 3/2018 Li et al.

FOREIGN PATENT DOCUMENTS

| CN | 202499887 U | 10/2012 |
|---|---|---|
| CN | 204058571 U | 12/2014 |

(Continued)

OTHER PUBLICATIONS

Machine translation of Cn 113999968A, which was provided in IDS filed on Nov. 29, 2024 and published on Feb. 1, 2022 (Year: 2022).*

(Continued)

*Primary Examiner* — Natasha E Young

(57) ABSTRACT

A high-pressure reactor acid adding system for laterite nickel ore hydrometallurgy includes: an acid liquor supply tank, an acid adding pipe, an acid adding pump, a pressure stabilizer, and a high-pressure reaction kettle, where one end of the acid adding pipe is communicated with the high-pressure reaction kettle, the other end thereof is communicated with the acid liquor supply tank, and the acid adding pump is disposed on the acid adding pipe and is configured to pressurize and pump acid liquor in the acid liquor supply tank to the high-pressure reaction kettle through the acid adding pipe; and the pressure stabilizer is disposed on the (Continued)

acid adding pipe and is configured to dynamically accommodate or discharge the acid liquor, to reduce pressure fluctuation in the acid adding pipe. Compared with the prior art, according to this disclosure, the pressure stabilizer is disposed on the acid adding pipe.

10 Claims, 1 Drawing Sheet

(56) References Cited

FOREIGN PATENT DOCUMENTS

| | | | |
|---|---|---|---|
| CN | 106222404 | A | 12/2016 |
| CN | 111101000 | A | 5/2020 |
| CN | 111254281 | A | 6/2020 |
| CN | 113999968 | A | 2/2022 |
| JP | 2019077914 | A | 5/2019 |
| JP | 2019157233 | A | 9/2019 |

OTHER PUBLICATIONS

International Search Report issued in corresponding International application No. PCT/CN2023/104629, mailed Mar. 16, 2024 (10 pages).

Written Opinion of the International Search Authority in corresponding International application No. PCT/CN2023/104629, mailed Mar. 16, 2024 (6 pages).

* cited by examiner

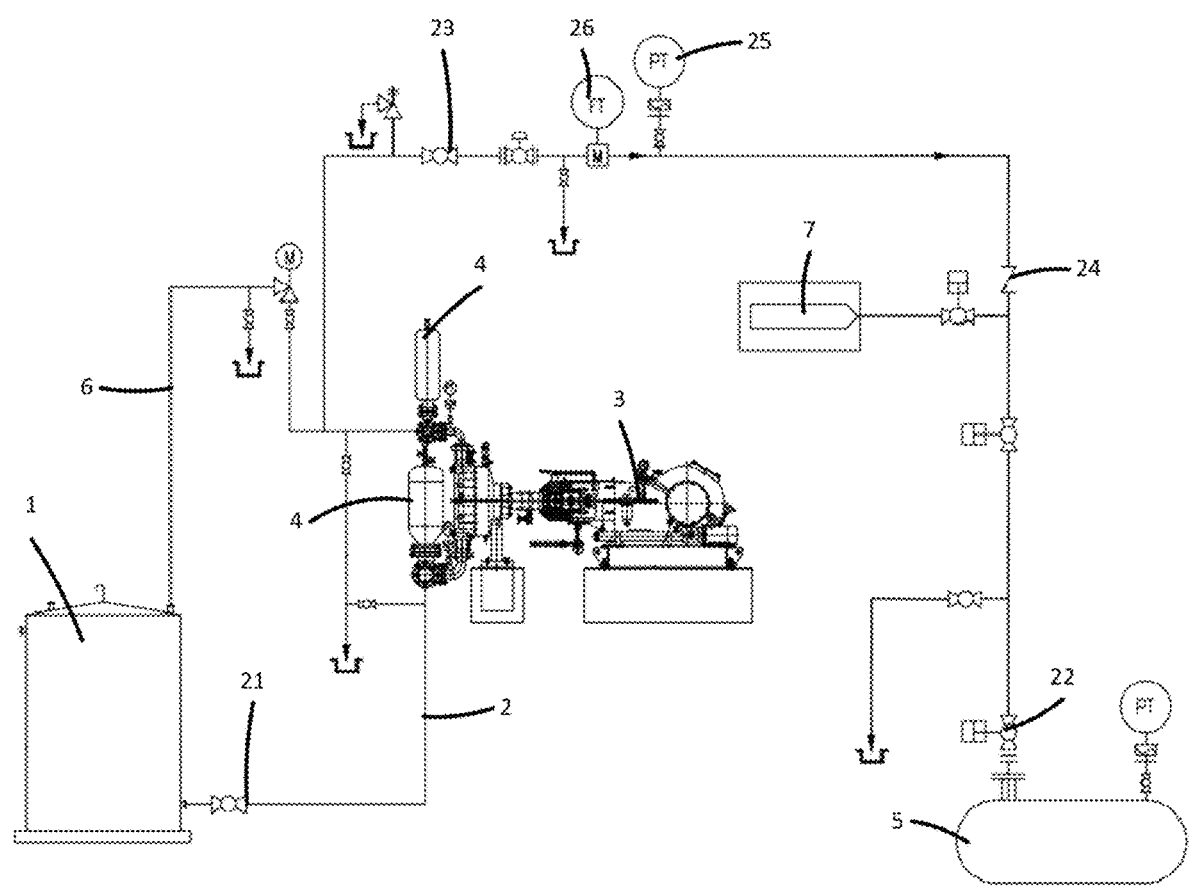

HIGH-PRESSURE REACTOR ACID ADDING SYSTEM FOR LATERITE NICKEL ORE HYDROMETALLURGY

This application is a national stage application, under 35 U.S.C. § 371, of PCT/CN2023/104629, now WO 2025/000446, filed Jun. 30, 2023, which is incorporated herein by reference in its entirety.

FIELD OF THE DISCLOSURE

This disclosure relates to the technical field of nickel ore processing, and in particular, to a high-pressure reactor acid adding system for laterite nickel ore hydrometallurgy.

BACKGROUND

Laterite nickel ore is a loose clay-like polymer, which contains nickel, iron, magnesium, cobalt, silicon, aluminum, and other element oxides and is formed from nickel-containing olivine bedrock undergoing long-term weathering, leaching, dipping, alteration, and other geological processes in a tropical or subtropical region. The iron element is severely oxidized to be in the +3 valence state, resulting in an overall reddish-brown appearance, hence the name laterite nickel ore. Different from nickel sulfide ore, the laterite nickel ore belongs to a refractory type of oxidized ore, which cannot be effectively enriched with nickel through a beneficiation method. Therefore, a common processing manner nowadays is to extract nickel from the laterite nickel ore by using steps of beneficiation, high-pressure acid leaching, and extraction.

During high-pressure leaching of the laterite nickel ore, it is necessary to continuously add acid liquor to a high-pressure reaction kettle, and due to a high-pressure environment in the high-pressure reaction kettle, it is necessary to pressurize the acid liquor, to enable pressure of the acid liquor to be greater than pressure in the high-pressure reaction kettle, so as to facilitate adding the acid liquor to the high-pressure reaction kettle. For example, the patent No. CN202210000475.5 provides a high-pressure reactor acid adding system and a control method, and the system includes: a high-pressure reactor; an acid adding pipe, where one end thereof is connected to the high-pressure reactor, the other end thereof is connected to a pump, to pump acid to the high-pressure reactor through the acid adding pipe, a third valve is disposed on the acid adding pipe, and the third valve is close to a pipe opening of the high-pressure reactor; and a ventilation pipe, connected to the acid adding pipe, to feed high-pressure gas in the ventilation pipe into the acid adding pipe, where a second valve is disposed on the ventilation pipe, a first valve is disposed on the acid adding pipe, and the first valve is located between the pump and a connection point that is between the ventilation pipe and the acid adding pipe.

However, the following problems exist: the system may cause fluctuation of pressure of acid liquor in the pipe when the valve is turned on or off, which may affect flow velocity of the acid liquor.

SUMMARY

In view of this, this disclosure provides a high-pressure reactor acid adding system for laterite nickel ore hydrometallurgy, to reduce pressure fluctuation in a pipe.

To achieve the above purpose, the technical solution of this disclosure for solving the technical problem is to provide a high-pressure reactor acid adding system for laterite nickel ore hydrometallurgy, including: an acid liquor supply tank, an acid adding pipe, an acid adding pump, a pressure stabilizer, and a high-pressure reaction kettle, where one end of the acid adding pipe is communicated with the high-pressure reaction kettle, the other end thereof is communicated with the acid liquor supply tank, and the acid adding pump is disposed on the acid adding pipe and is configured to pump acid liquor in the acid liquor supply tank to the high-pressure reaction kettle in a pressurizing manner through the acid adding pipe; and the pressure stabilizer is disposed on the acid adding pipe and is configured to dynamically accommodate or discharge the acid liquor, to reduce pressure fluctuation in the acid adding pipe.

Further, two pressure stabilizers are included and are respectively disposed at an inlet of the acid adding pump and an outlet of the acid adding pump.

Further, the pressure stabilizer includes a pressure stabilizing tank and a pressure supply device, where one end of the pressure stabilizing tank is communicated with the pressure supply device, the other end of the pressure stabilizing tank is communicated with the acid adding pipe, a middle portion of the pressure stabilizing tank is provided with a flexible film, to internally divide the pressure stabilizing tank into an acid liquor accommodation space communicated with the acid adding pipe and a pressure stabilizing space communicated with the pressure supply device, and the pressure supply device enables pressure in the pressure stabilizing space to reach a set range.

Further, a supply valve is disposed at one end, close to the acid liquor supply tank, of the acid adding pipe, and a discharge valve is disposed at one end, close to the high-pressure reaction kettle, of the acid adding pipe.

Further, a reflux pipe is further included, where one end of the reflux pipe is connected to the acid adding pipe that is between the acid adding pump and the high-pressure reaction kettle, the other end of the reflux pipe is communicated with the acid liquor supply tank, and a reflux valve is disposed at a communication position that is between the acid adding pipe and the reflux pipe.

Further, a gas supply device is further included, where the gas supply device is communicated with the acid adding pipe and is configured to supply gas meeting preset pressure to the acid adding pipe when acid supply is stopped, to enable remaining acid liquor in the acid adding pipe to be fed into the high-pressure reaction kettle at appropriate pressure.

Further, an anti-reflux valve is disposed on the acid adding pipe, and the anti-reflux valve is located between a connection position that is between the acid adding pump and the acid adding pipe and a connection position that is between an air compression pump and the acid adding pipe.

Further, a pressure gauge is disposed on the acid adding pipe and is configured to detect the pressure in the acid adding pipe.

Further, a flow meter is disposed on the acid adding pipe and is configured to detect a flow rate of the acid liquor in the acid adding pipe.

Further, an inner wall of the high-pressure reaction kettle is coated with a titanium alloy layer.

Compared with the prior art, the high-pressure reactor acid adding system for laterite nickel ore hydrometallurgy and a method provided in this disclosure have the following beneficial effects:

Compared with the prior art, according to this disclosure, the pressure stabilizer is disposed on the acid adding pipe, the pressure stabilizer can accommodate a part of the acid liquor when the pressure in the acid adding pipe is too high, to reduce the pressure of the acid adding pipe, or discharge a part of the acid liquor when the pressure in the acid adding pipe is too low, to increase the pressure of the acid adding pipe, thereby reducing pressure fluctuation in the acid adding pipe, maintaining pressure of the acid liquor in the acid adding pipe within an appropriate range, and helping improve an acid leaching effect in the high-pressure reaction kettle.

BRIEF DESCRIPTION OF THE DRAWINGS

FIG. 1 is a schematic diagram of a high-pressure reactor acid adding system for laterite nickel ore hydrometallurgy according to this disclosure.

Reference numerals in the accompanying drawings: 1: acid liquor supply tank; 2: acid adding pipe; 21: supply valve; 22: discharge valve; 23: reflux valve; 24: anti-reflux valve; 25: pressure gauge; 26: flow meter; 3: acid adding pump; 4: pressure stabilizer; 5: high-pressure reaction kettle; 6: reflux pipe; 7: gas supply device.

DETAILED DESCRIPTION OF PREFERRED EMBODIMENTS

To make the purposes, technical solutions, and advantages of this disclosure clearer, the following further describes this disclosure in detail with reference to the accompanying drawings and embodiments. It should be understood that, specific embodiments described herein are merely used to explain this disclosure but not to limit this disclosure.

Referring to FIG. 1, this disclosure provides a high-pressure reactor acid adding system for laterite nickel ore hydrometallurgy, including: an acid liquor supply tank 1, an acid adding pipe 2, an acid adding pump 3, a pressure stabilizer 4, and a high-pressure reaction kettle 5, where one end of the acid adding pipe 2 is communicated with the high-pressure reaction kettle 5, the other end thereof is communicated with the acid liquor supply tank 1, and the acid adding pump 3 is disposed on the acid adding pipe 2 and is configured to pump acid liquor in the acid liquor supply tank 1 to the high-pressure reaction kettle 5 in a pressurizing manner through the acid adding pipe 2; and the pressure stabilizer 4 is disposed on the acid adding pipe 2 and is configured to dynamically accommodate or discharge the acid liquor, to reduce pressure fluctuation in the acid adding pipe 2.

Compared with the prior art, according to this disclosure, the pressure stabilizer 4 is disposed on the acid adding pipe 2, the pressure stabilizer 4 can accommodate a part of the acid liquor when pressure in the acid adding pipe 2 is too high, to reduce the pressure of the acid adding pipe 2, or discharge a part of the acid liquor when pressure in the acid adding pipe 2 is too low, to increase the pressure of the acid adding pipe 2, thereby reducing pressure fluctuation in the acid adding pipe 2, maintaining pressure of the acid liquor in the acid adding pipe 2 within an appropriate range, and helping improve an acid leaching effect in the high-pressure reaction kettle 5.

Specifically, the acid liquor supply tank 1 stores acid liquor used for acid leaching processing.

Specifically, a supply valve 21 is disposed at one end, close to the acid liquor supply tank 1, of the acid adding pipe 2, and a discharge valve 22 is disposed at one end, close to the high-pressure reaction kettle 5, of the acid adding pipe. Supply of the acid liquor may be interrupted by turning off the supply valve 21 and the discharge valve 22.

Specifically, the acid adding pump 3 has a capability of pressurizing and pumping and can pump out the acid liquor in a pressurizing manner. Generally, a range of internal pressure intensity of the high-pressure reaction kettle 5 is generally from 1.5 MPa to 5 MPa, and to maintain smooth feeding of the acid liquor, the pressure of the acid liquor needs to be greater than the internal pressure intensity of the high-pressure reaction kettle 5 by 0.1 MPa to 0.3 MPa.

Specifically, the pressure stabilizer 4 includes a pressure stabilizing tank and a pressure supply device, one end of the pressure stabilizing tank is communicated with the pressure supply device, the other end of the pressure stabilizing tank is communicated with the acid adding pipe 2, a middle portion of the pressure stabilizing tank is provided with a flexible film, to internally divide the pressure stabilizing tank into an acid liquor accommodation space communicated with the acid adding pipe 2 and a pressure stabilizing space communicated with the pressure supply device, and the pressure supply device enables pressure in the pressure stabilizing space to reach a set range. During use, air pressure in the pressure stabilizing space is enabled to be the same as preset pumping pressure of the acid liquor; when the pressure in the acid adding pipe 2 is too high, pressure of the acid liquor accommodation space is increased, to enable the flexible film to deform toward the pressure stabilizing space, and a space of the acid liquor accommodation space is increased, to accommodate more acid liquor, thereby reducing the pressure in the acid adding pipe 2; and when the pressure in the acid adding pipe 2 is too low, pressure of the acid liquor accommodation space is reduced, the air pressure in the pressure stabilizing space drives the flexible film to deform toward the acid liquor accommodation space, a space of the acid liquor accommodation space is reduced, and the acid liquor in the acid liquor accommodation space is discharged into the acid adding pipe 2, thereby increasing the pressure in the acid adding pipe 2.

In the embodiment, the pressure supply device is an air pump.

Further, two pressure stabilizers 4 are included and are respectively disposed at an inlet of the acid adding pump 3 and an outlet of the acid adding pump 3.

Specifically, an inner wall of the high-pressure reaction kettle 5 is coated with a titanium alloy layer, which can achieve an anti-corrosion effect and prolong a service life.

Specifically, a reflux pipe 6 is further included, one end of the reflux pipe 6 is connected to the acid adding pipe 2 that is between the acid adding pump 3 and the high-pressure reaction kettle 5, the other end of the reflux pipe 6 is communicated with the acid liquor supply tank 1, and a reflux valve 23 is disposed at a communication position that is between the acid adding pipe 2 and the reflux pipe 6. The reflux pipe 6 is disposed for a purpose of implementing circulation pressurization at an initial stage of acid adding. During pressurization, the reflux valve 23 and the discharge valve 22 are turned off, acid liquor discharged by the acid adding pump 3 can flow back to the acid liquor supply tank 1 through the reflux pipe 6 only, and the acid adding pump 3 gradually performs pressurization, to enable the pressure of the acid liquor to reach a preset value. At this time, the reflux valve 23 and the discharge valve 22 are turned on, and acid liquor meeting a pressure requirement is fed into the high-pressure reaction kettle 5 through the acid adding pipe 2. According to a design of the reflux pipe, a sulfuric acid feeding start-up pump can be canceled, acid supply can be simplified, and an acid supply system can be stabilized.

Specifically, a gas supply device 7 is further included, and the gas supply device 7 is communicated with the acid adding pipe 2 and is configured to supply gas meeting preset pressure to the acid adding pipe 2 when acid supply is stopped, to enable remaining acid liquor in the acid adding pipe 2 to be fed into the high-pressure reaction kettle 5 at appropriate pressure. In the embodiment, the gas supply device is a high-pressure air compressor.

Further, an anti-reflux valve 24 is disposed on the acid adding pipe 2, and the anti-reflux valve 24 is located between a connection position that is between the acid adding pump 3 and the acid adding pipe 2 and a connection position that is between the air compression pump 7 and the acid adding pipe 2. When acid supply is stopped, the anti-reflux valve 24 is turned off, and the anti-reflux valve can block the acid liquor in the acid adding pipe 2 from flowing back to the acid adding pump 3 under driving of high-pressure gas of the air compression pump 7, to protect the acid adding pump 3.

Further, a pressure gauge 25 is disposed on the acid adding pipe 2 and is configured to detect the pressure in the acid adding pipe 2.

Further, a flow meter 26 is disposed on the acid adding pipe 2 and is configured to detect a flow rate of the acid liquor in the acid adding pipe 2.

During use, the acid liquor is pressurized first, the reflux valve 23 and the discharge valve 22 are turned off, the acid liquor discharged by the acid adding pump 3 can flow back to the acid liquor supply tank 1 through the reflux pipe 6 only, and the acid adding pump 3 gradually performs pressurization, to enable the pressure of the acid liquor to reach a preset value. At this time, the reflux valve 23 and the discharge valve 22 are turned on, and acid liquor meeting a pressure requirement is fed into the high-pressure reaction kettle 5 through the acid adding pipe 2; during acid liquor supply, pressure fluctuation may occur, when the pressure in the acid adding pipe 2 is too high, pressure of the acid liquor accommodation space is increased, to enable the flexible film to deform toward the pressure stabilizing space, and a space of the acid liquor accommodation space is increased, to accommodate more acid liquor, thereby reducing the pressure in the acid adding pipe 2; when the pressure in the acid adding pipe 2 is too low, pressure of the acid liquor accommodation space is reduced, the air pressure in the pressure stabilizing space drives the flexible film to deform toward the acid liquor accommodation space, a space of the acid liquor accommodation space is reduced, and the acid liquor in the acid liquor accommodation space is discharged into the acid adding pipe 2, thereby increasing the pressure in the acid adding pipe 2, and the pressure stabilizer 4 can reduce an amplitude of the pressure fluctuation; and when acid supply is stopped, the anti-reflux valve 24 is turned off, the air compression pump 7 supplies the high-pressure gas into the acid adding pipe 2, to enable the remaining acid liquor in the acid adding pipe 2 to be fed into the high-pressure reaction kettle 5 at appropriate pressure, and the anti-reflux valve 24 blocks the acid liquor in the acid adding pipe 2 from flowing back to the acid adding pump 3 under the driving of the high-pressure gas of the air compression pump 7, to protect the acid adding pump 3.

Compared with the prior art, this disclosure has the following advantages:

Compared with the prior art, according to this disclosure, the pressure stabilizer is disposed on the acid adding pipe, the pressure stabilizer can accommodate a part of the acid liquor when the pressure in the acid adding pipe is too high, to reduce the pressure of the acid adding pipe, or discharge a part of the acid liquor when the pressure in the acid adding pipe is too low, to increase the pressure of the acid adding pipe, thereby reducing pressure fluctuation in the acid adding pipe, maintaining pressure of the acid liquor in the acid adding pipe within an appropriate range, and helping improve an acid leaching effect in the high-pressure reaction kettle.

The foregoing descriptions are specific implementations of this disclosure, but are not intended to limit the protection scope of this disclosure. Any other corresponding changes and modifications made according to the technical concept of this disclosure shall fall within the protection scope of this disclosure.

What is claimed is:

1. A high-pressure reactor acid adding system for laterite nickel ore hydrometallurgy, comprising:
   an acid liquor supply tank, an acid adding pipe, an acid adding pump, at least one pressure stabilizer, and a high-pressure reaction kettle, wherein one end of the acid adding pipe is communicated with the high-pressure reaction kettle, the other end thereof is communicated with the acid liquor supply tank, and the acid adding pump is disposed on the acid adding pipe and is configured to pump acid liquor in the acid liquor supply tank to the high-pressure reaction kettle in a pressurizing manner through the acid adding pipe; and the at least one pressure stabilizer is disposed on the acid adding pipe and is configured to dynamically accommodate or discharge the acid liquor, to reduce pressure fluctuation in the acid adding pipe.

2. The high-pressure reactor acid adding system for laterite nickel ore hydrometallurgy according to claim 1, wherein the at least one pressure stabilizer comprising:
   two pressure stabilizers, respectively disposed at an inlet of the acid adding pump and an outlet of the acid adding pump.

3. The high-pressure reactor acid adding system for laterite nickel ore hydrometallurgy according to claim 1,
   wherein the at least one pressure stabilizer comprises a pressure stabilizing tank and a pressure supply device, wherein one end of the pressure stabilizing tank is communicated with the pressure supply device, the other end of the pressure stabilizing tank is communicated with the acid adding pipe, a middle portion of the pressure stabilizing tank is provided with a flexible film, to internally divide the pressure stabilizing tank into an acid liquor accommodation space communicated with the acid adding pipe and a pressure stabilizing space communicated with the pressure supply device, and the pressure supply device enables pressure in the pressure stabilizing space to reach a set range.

4. The high-pressure reactor acid adding system for laterite nickel ore hydrometallurgy according to claim 1,
   wherein a supply valve is disposed at one end, close to the acid liquor supply tank, of the acid adding pipe, and a discharge valve is disposed at one end, close to the high-pressure reaction kettle, of the acid adding pipe.

5. The high-pressure reactor acid adding system for laterite nickel ore hydrometallurgy according to claim 4, further comprising:
   a reflux pipe, wherein one end of the reflux pipe is connected to the acid adding pipe that is between the acid adding pump and the high-pressure reaction kettle, the other end of the reflux pipe is communicated with the acid liquor supply tank, and a reflux valve is disposed at a communication position that is between the acid adding pipe and the reflux pipe.

6. The high-pressure reactor acid adding system for laterite nickel ore hydrometallurgy according to claim 4, further comprising:
- a gas supply device, wherein the gas supply device is communicated with the acid adding pipe and is configured to supply gas meeting preset pressure to the acid adding pipe when acid supply is stopped, to enable remaining acid liquor in the acid adding pipe to be fed into the high-pressure reaction kettle at appropriate pressure.

7. The high-pressure reactor acid adding system for laterite nickel ore hydrometallurgy according to claim 6,
- wherein an anti-reflux valve is disposed on the acid adding pipe, and the anti-reflux valve is located between a connection position that is between the acid adding pump and the acid adding pipe and a connection position that is between an air compression pump and the acid adding pipe.

8. The high-pressure reactor acid adding system for laterite nickel ore hydrometallurgy according to claim 1,
- wherein a pressure gauge is disposed on the acid adding pipe and is configured to detect pressure in the acid adding pipe.

9. The high-pressure reactor acid adding system for laterite nickel ore hydrometallurgy according to claim 1,
- wherein a flow meter is disposed on the acid adding pipe and is configured to detect a flow rate of the acid liquor in the acid adding pipe.

10. The high-pressure reactor acid adding system for laterite nickel ore hydrometallurgy according to claim 1,
- wherein an inner wall of the high-pressure reaction kettle is coated with a titanium alloy layer.

\* \* \* \* \*